F. C. FARNELL.
WATER FILTER.
APPLICATION FILED FEB. 15, 1908.

903,070. Patented Nov. 3, 1908.

Granite
Charcoal
Marble
Charcoal
Granite

Witnesses

Inventor
Frank C. Farnell.
By
Attorneys

UNITED STATES PATENT OFFICE.

FRANK C. FARNELL, OF LOS ANGELES, CALIFORNIA, ASSIGNOR OF ONE-THIRD TO CALVIN F. HUNTER AND ONE-THIRD TO THOMAS N. CAMFIELD, BOTH OF LOS ANGELES, CALIFORINA.

WATER-FILTER.

No. 903,070.　　　Specification of Letters Patent.　　　Patented Nov. 3, 1908.

Application filed February 15, 1908. Serial No. 416,060.

*To all whom it may concern:*

Be it known that I, FRANK C. FARNELL, a citizen of the United States, residing at the city of Los Angeles, in the county of Los Angeles and State of California, have invented certain new and useful Improvements in Water-Filters, of which the following is a specification.

This invention relates to water filters, and consists of a stone-ware filter especially adapted for domestic use, and characterized by improvement with respect to the means for straining and filtering the water, and with respect to the construction for supporting and holding the water and the filtering mediums. The device has the advantage of simplicity of construction, and its parts may be readily separated by simply lifting one from the other, and when separated can be readily cleaned. The filtering material can also be quickly removed and renewed whenever desired.

Figure 1:
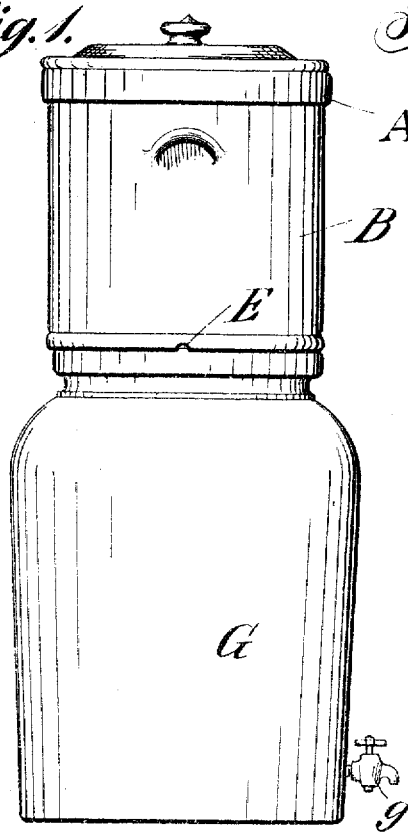
Figure 2:
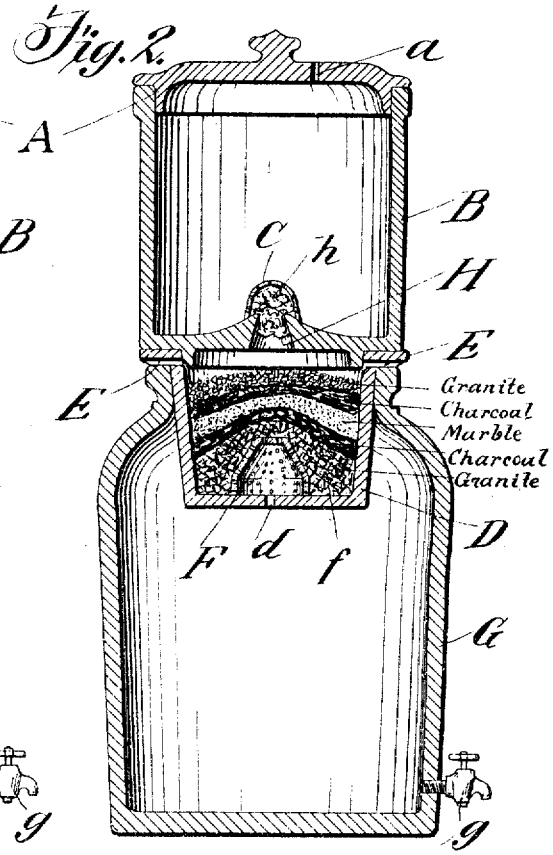
Figure 3:
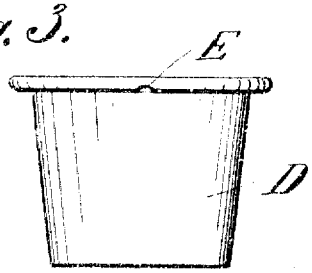
Figure 4:
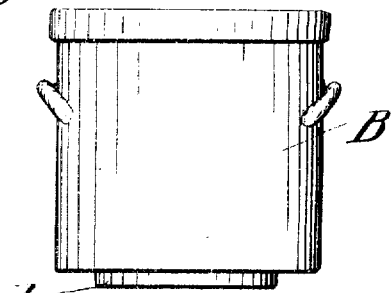

The invention is illustrated in the accompanying drawings in which Figure 1 is a side elevation of the device. Fig. 2 is a central vertical section. Figs. 3 and 4 are details in elevation of the filtering cartridge and the settling tank.

Referring specifically to the drawings, G indicates a stone-ware jar or filtered water container the mouth of which receives a cartridge, consisting of a stone-ware cup D having a drip hole $d$ in the bottom and having air vents E in the rim where it rests upon the top of the jar. The cup D contains an inverted porous cup F, over the drip hole $d$, and is filled or packed with filtering material preferably consisting of layers of broken granite, charcoal, marble, charcoal, and granite, in the order named, as indicated at $f$. The stone ware settling tank B sets upon the cartridge, having a flange $b$ at the bottom to hold it in place thereon, and this settling tank is provided with a stone ware cover A having an air vent $a$. The bottom of the settling tank has an opening H therethrough of sufficient size to hold a strainer such as a sponge as indicated at $h$, and this hole and sponge are covered by a porous inverted cup C, which has for its object to prevent sediment coming in contact with the sponge or strainer. The bottom of the tank B is raised around the hole H, so that the settlings or sediment will not collect around the hole but in the deeper part near the sides of the tank. Water placed in the settling tank will flow slowly through the sponge and into the filtering cartridge where it will be purified by passing through the granular filtering material or bed and thence through the percolating cup F, and out the drip hole at $d$ into the jar G, from which it may be drawn as necessary through the cock $g$.

As apparent, there is an entire absence of metallic parts, and consequently a freedom from any contamination incident to the corrosion or action of the metals. The parts can be quickly separated by simply lifting one from the other, and so can be easily cleaned whenever necessary. The filtering material in the cartridge can be emptied out and renewed in a few minutes' time, and all parts of the device are capable of being washed by hand inside and out, without difficulty.

I claim:

A settling tank for a filter, having a hole in the bottom with a conical rim around the hole raised above the remainder of the surface of the bottom, straining material in the hole, and an inverted cup over the said hole and resting at its lower edge on the sides of the rim below the top thereof.

In testimony whereof I affix my signature, in presence of two witnesses.

FRANK C. FARNELL.

Witnesses:
　CAL F. HUNTER,
　W. G. COGSWELL.